US012650679B2

(12) United States Patent
Uno

(10) Patent No.: US 12,650,679 B2
(45) Date of Patent: Jun. 9, 2026

(54) NUMERICAL CONTROLLER AND COMPUTER READABLE STORAGE MEDIUM

(71) Applicant: Fanuc Corporation, Minamitsuru-gun (JP)

(72) Inventor: Kousuke Uno, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 380 days.

(21) Appl. No.: 18/276,942

(22) PCT Filed: Feb. 28, 2022

(86) PCT No.: PCT/JP2022/008286
§ 371 (c)(1),
(2) Date: Aug. 11, 2023

(87) PCT Pub. No.: WO2022/186135
PCT Pub. Date: Sep. 9, 2022

(65) Prior Publication Data
US 2024/0118678 A1      Apr. 11, 2024

(30) Foreign Application Priority Data

Mar. 2, 2021     (JP) ................................. 2021-032836

(51) Int. Cl.
G05B 19/4155          (2006.01)
(52) U.S. Cl.
CPC .................... G05B 19/4155 (2013.01); G05B 2219/35519 (2013.01)

(58) Field of Classification Search
None
See application file for complete search history.

(56) References Cited

U.S. PATENT DOCUMENTS 4,707,793  A  *  11/1987  Anderson  ..........  G05B 19/4163
                                                              700/188
2007/0046238  A1     3/2007  Xu
(Continued)

FOREIGN PATENT DOCUMENTS

| CN | 105458830 A | 4/2016 |
|---|---|---|
| CN | 108693768 A | 10/2018 |

(Continued)

OTHER PUBLICATIONS

Notice of Allowance (Decision to Grant a Patent) issued Mar. 11, 2025, by the Japan Patent Office in corresponding Japanese Patent Application No. 2023-503822 and an English translation of the Notice of Allowance. (5 pages).
(Continued)

*Primary Examiner* — Ryan A Jarrett
(74) *Attorney, Agent, or Firm* — BUCHANAN INGERSOLL & ROONEY PC

(57)          ABSTRACT
A numerical controller includes: a spindle load detection unit that detects time-series data on a load on a spindle when a workpiece is machined; a target load setting unit that sets a target load on the spindle; a machining time prediction unit that, based on the time-series data, predicts a machining time taken when a feed rate of the spindle is controlled so that a load on the spindle matches the target load; and a machining time output unit that outputs data on the predicted machining time.

8 Claims, 8 Drawing Sheets

(56) References Cited

U.S. PATENT DOCUMENTS

| | | |
|---|---|---|
| 2016/0089759 A1 | 3/2016 | Morita et al. |
| 2016/0147212 A1 | 5/2016 | Kurosumi |
| 2018/0284720 A1 | 10/2018 | Uno |
| 2019/0196417 A1 | 6/2019 | Uno |
| 2019/0265680 A1 | 8/2019 | Uno |
| 2020/0159183 A1 | 5/2020 | Ueda |
| 2020/0316743 A1 | 10/2020 | Okamoto et al. |

FOREIGN PATENT DOCUMENTS

| | | |
|---|---|---|
| JP | H11-129144 A | 5/1999 |
| JP | H11-296214 A | 10/1999 |
| JP | H11-296414 A | 10/1999 |
| JP | 2010092405 A | 4/2010 |
| JP | 2013188831 A | 9/2013 |
| JP | 2016-087781 A | 5/2016 |
| JP | 2016-097491 A | 5/2016 |
| JP | 2019117458 A | 7/2019 |
| JP | 2019149041 A | 9/2019 |
| JP | 2020171973 A | 10/2020 |
| WO | 2019016892 A1 | 1/2019 |

OTHER PUBLICATIONS

Office Action (Notice of Reasons for Refusal) issued Dec. 3, 2024, by the Japan Patent Office in corresponding Japanese Patent Application No. 2023-503822 and an English translation of the Office Action. (12 pages).

International Search Report and Written Opinion for International Application No. PCT/JP2022/008286, dated May 17, 2022, 7 pages.

Office Action (The First Office Action) issued Dec. 1, 2025, by the State Intellectual Property Office of People's Republic of China in corresponding Chinese Patent Application No. 202280016914.X and an English translation of the Office Action. (19 pages).

* cited by examiner

START

DETECT TIME-SERIES DATA ⟩ S1

STORE TIME-SERIES DATA ⟩ S2

ACCEPT TARGET LOAD ⟩ S3

SET TARGET LOAD ⟩ S4

PREDICT MACHINING TIME ⟩ S5

OUTPUT ⟩ S6

END

MACHINING TIME PREDICTION UNIT     217

LEARNING UNIT     221

CORRELATION MODEL STORAGE UNIT     222

PREDICTION UNIT     223

NUMERICAL CONTROLLER AND COMPUTER READABLE STORAGE MEDIUM

CROSS REFERENCE FOR RELATED APPLICATIONS

This is the U.S. National Phase application of PCT/JP2022/008286, filed Feb. 28, 2022, which claims priority to Japanese Patent Application No. 2021-032836, filed Mar. 2, 2021, the disclosures of each of these applications being incorporated herein by reference in their entireties for all purposes.

FIELD OF THE INVENTION

The present disclosure relates to a numerical controller that controls a machine tool and to a computer readable storage medium.

BACKGROUND OF THE INVENTION

In machine tools, a technology to control the feed rate of a spindle so that the load on the spindle remains constant is known (for example, Patent Literature 1). Such control can extend the lifetime of a tool.

PATENT LITERATURE

Patent Literature 1: Japanese Patent Application Laid-Open No. 2019-117458

SUMMARY OF THE INVENTION

When controlling the feed rate of a spindle so that the load on the spindle remains constant, however, it is difficult to predict a machining time, because the feed rate changes in accordance with the load.

The present disclosure intends to provide a numerical controller that can predict a machining time before controlling the feed rate of a spindle so that the load on the spindle remains constant and to provide a computer readable storage medium.

A numerical controller includes: a spindle load detection unit that detects time-series data on a load on a spindle when a workpiece is machined; a target load setting unit that sets a target load on the spindle; a machining time prediction unit that, based on the time-series data, predicts a machining time taken when a feed rate of the spindle is controlled so that a load on the spindle matches the target load; and a machining time output unit that outputs data on the predicted machining time.

A computer readable storage medium stores an instruction that causes a computer to perform: detecting time-series data on a load on a spindle when a workpiece is machined; setting a target load on the spindle; based on the time-series data, predicting a machining time taken when a feed rate of the spindle is controlled so that a load on the spindle matches the target load; and outputting data on the predicted machining time.

The present disclosure makes it possible to predict a machining time before controlling the feed rate of a spindle so that the load on the spindle remains constant.

BRIEF DESCRIPTION OF DRAWINGS

FIG. 10 is a diagram illustrating an example of time-series data on a load on a spindle.

FIG. 11 is a diagram illustrating an example of a frequency distribution.

DETAILED DESCRIPTION OF EMBODIMENTS OF THE INVENTION

One embodiment of the present disclosure will be described below with reference to the drawings. Note that not all of the combined features described in the following embodiment are necessarily required for solving the problem. Further, detailed description than is needed may be omitted. Further, the description and the drawings of the following embodiment are provided for those skilled in the art to fully understand the present disclosure and are not intended to limit the claims.

Figure 1:
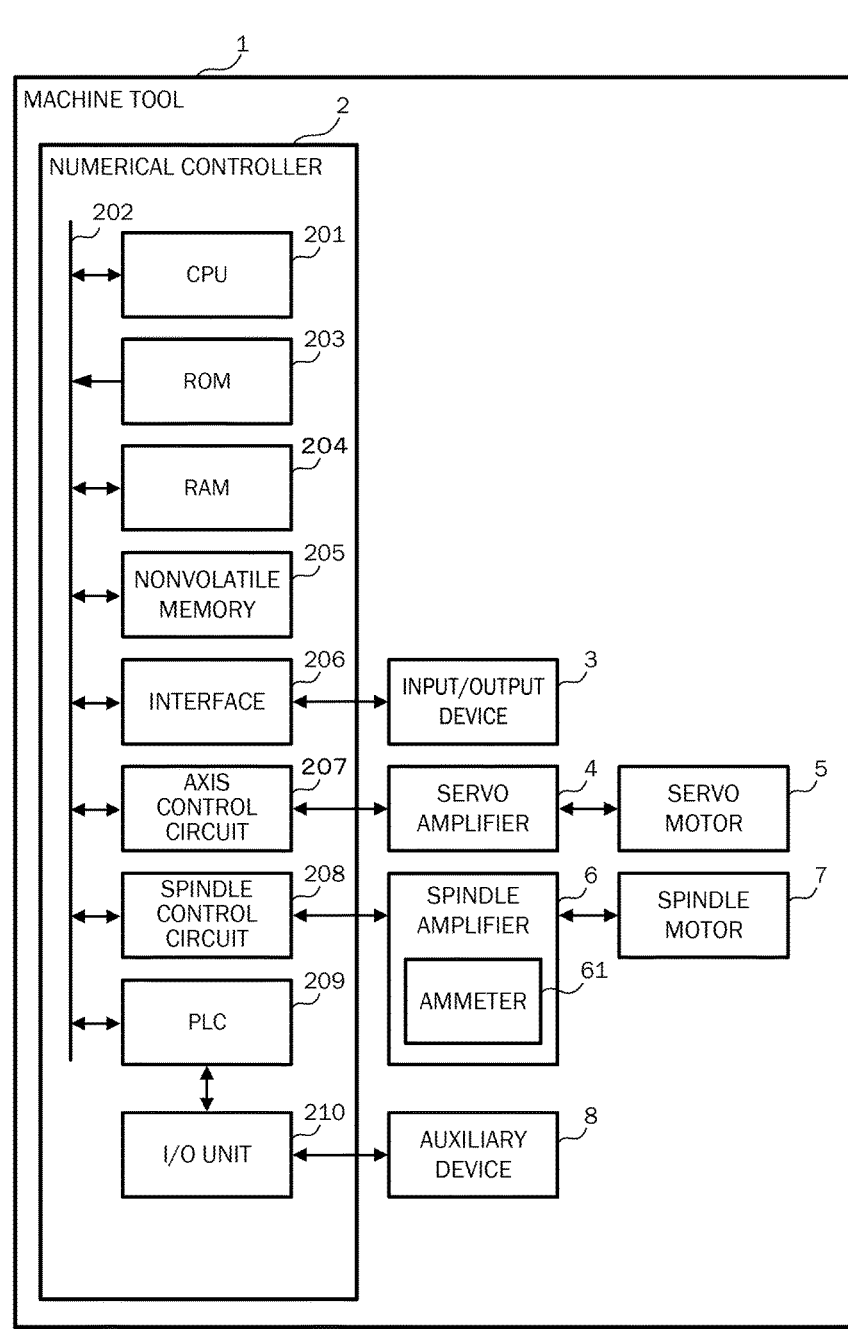
FIG. 1 is a diagram illustrating an example of a hardware configuration of a machine tool.

FIG. 1 is a diagram illustrating an example of a hardware configuration of a machine tool. The machine tool 1 is, for example, a lathe, a machining center, or a multi-tasking machine.

The machine tool 1 has a numerical controller 2, an input/output device 3, a servo amplifier 4 and a servo motor 5, a spindle amplifier 6 and a spindle motor 7, and an auxiliary device 8, for example.

The numerical controller 2 is a device that controls the overall machine tool 1. The numerical controller 2 has a central processing unit (CPU) 201, a bus 202, a read-only memory (ROM) 203, a random-access memory (RAM) 204, and a nonvolatile memory 205.

The CPU 201 is a processor that controls the overall numerical controller 2 in accordance with a system program. The CPU 201 reads a system program or the like stored in the ROM 203 via the bus 202. Further, the CPU 201 controls the servo motor 5 and the spindle motor 7 in accordance with a machining program.

The CPU 201 performs, for example, analysis of a machining program and output of a control command to the servo motor 5 in each control cycle.

The bus 202 is a communication path connecting respective hardware components in the numerical controller 2 to each other. Respective hardware components in the numerical controller 2 transfer data to each other via the bus 202.

The ROM 203 is a storage device that stores a system program or the like used for controlling the overall numerical controller 2. The ROM 203 functions as a computer readable storage medium.

The RAM 204 is a storage device that temporarily stores various data. The RAM 204 functions as a work area where the CPU 201 processes various data.

The nonvolatile memory 205 is a storage device that holds data even when the machine tool 1 is powered off and the numerical controller 2 is not supplied with power. For example, the nonvolatile memory 205 stores a machining program and stores various parameters input from the input/output device 3. The nonvolatile memory 205 functions as a computer readable storage medium. The nonvolatile memory 205 is formed of a solid state drive (SSD), for example.

The numerical controller 2 further includes an interface 206, an axis control circuit 207, a spindle control circuit 208, a programmable logic controller (PLC) 209, and an I/O unit 210.

The interface 206 connects the bus 202 and the input/output device 3 to each other. For example, the interface 206 transmits various data processed by the CPU 201 to the input/output device 3.

The input/output device 3 is a device that receives various data via the interface 206 and displays the various data. Further, the input/output device 3 accepts input of various data and transmits the various data to the CPU 201 via the interface 206. The input/output device 3 includes a display such as a liquid crystal display (LCD), a keyboard, a mouse, and the like. Alternatively, the input/output device 3 may be a touch panel.

The axis control circuit 207 is a circuit that controls the servo motor 5. The axis control circuit 207 outputs a command for driving the servo motor 5 to the servo amplifier 4 in response to a control command from the CPU 201. For example, the axis control circuit 207 transmits a torque command used for controlling the torque of the servo motor 5 to the servo amplifier 4.

The servo amplifier 4 supplies current to the servo motor 5 in response to a command from the axis control circuit 207.

The servo motor 5 is driven in response to being supplied with current from the servo amplifier 4. For example, the servo motor 5 is coupled to a ball screw that drives a tool post, a spindle head, or a table. When the servo motor 5 is driven, a structure of the machine tool 1, such as a tool post, a spindle head, a table, or the like, moves in the X-axis direction, the Y-axis direction, or the Z-axis direction, for example. Note that a speed detector (not illustrated) that measures the feed rate of each axis may be built in the servo motor 5.

The spindle control circuit 208 is a circuit for controlling the spindle motor 7. The spindle control circuit 208 outputs a command for driving the spindle motor 7 to the spindle amplifier 6 in response to a control command from the CPU 201. For example, the spindle control circuit 208 transmits a torque command for controlling the torque of the spindle motor 7 to the spindle amplifier 6.

The spindle amplifier 6 supplies current to the spindle motor 7 in response to a command from the spindle control circuit 208. An ammeter 61 that measures a current value of current supplied to the spindle motor 7 is built in in the spindle amplifier 6.

The ammeter 61 measures a current value of current supplied to the spindle motor 7. The ammeter 61 transmits data indicating a measured current value to the CPU 201.

The spindle motor 7 is driven in response to current supply from the spindle amplifier 6. The spindle motor 7 is coupled to a spindle and rotates the spindle.

The PLC 209 is a device that executes a ladder program to control the auxiliary device 8. The PLC 209 transmits a command to the auxiliary device 8 via the I/O unit 210.

The I/O unit 210 is an interface that connects the PLC 209 and the auxiliary device 8 to each other. The I/O unit 210 transmits a command received from the PLC 209 to the auxiliary device 8.

The auxiliary device 8 is installed in the machine tool 1 and performs auxiliary operations in the machine tool 1. The auxiliary device 8 operates based on a command received from the I/O unit 210. The auxiliary device 8 may be a device installed around the machine tool 1. The auxiliary device 8 is, for example, a tool changer, a cutting fluid injector, or an opening/closing door drive device.

Next, an example of the functions of the numerical controller 2 will be described. The numerical controller 2 detects a load on the spindle when a workpiece is machined at a feed rate instructed by a machining program. Furthermore, based on data on the detected load on the spindle, the numerical controller 2 predicts a machining time taken when the workpiece is machined such that the load on the spindle matches a target load.

Figure 2:
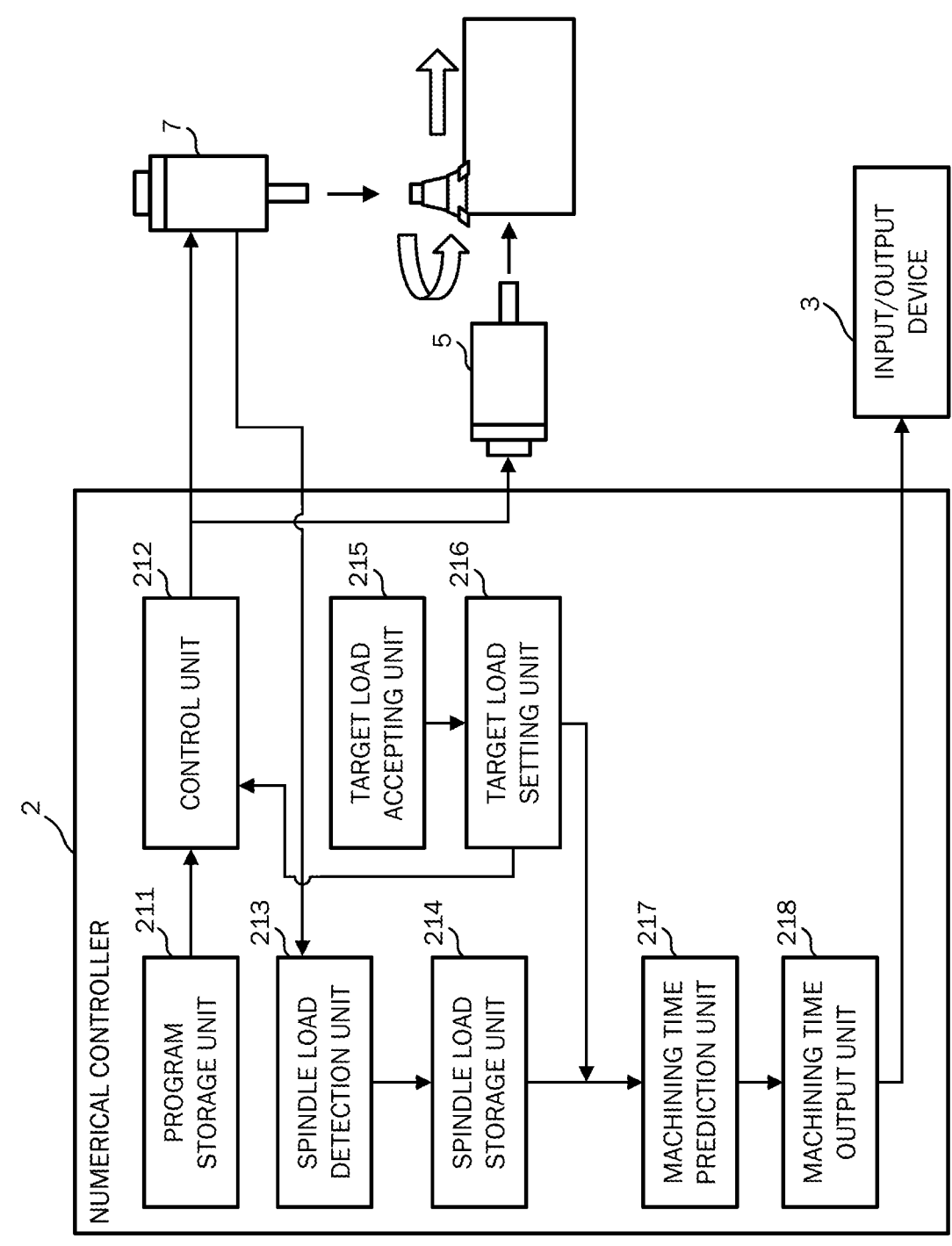
FIG. 2 is a block diagram illustrating an example of functions of a numerical controller.

FIG. 2 is a block diagram illustrating an example of functions of the numerical controller 2. The numerical controller 2 includes a program storage unit 211, a control unit 212, a spindle load detection unit 213, a spindle load storage unit 214, a target load accepting unit 215, a target load setting unit 216, a machining time prediction unit 217, and a machining time output unit 218.

The program storage unit 211 and the spindle load storage unit 214 are implemented when a machining program input from the input/output device 3 or the like and data input from the ammeter 61 and various sensors are stored in the RAM 204 or the nonvolatile memory 205.

The control unit 212, the spindle load detection unit 213, the target load accepting unit 215, the target load setting unit 216, the machining time prediction unit 217, and the machining time output unit 218 are implemented when the CPU 201 performs calculation processing by using a system program stored in the ROM 203 and a machining program and various data stored in the nonvolatile memory 205, for example.

The program storage unit 211 stores a machining program. The machining program is a program for operating each unit of the machine tool 1 to perform machining of a workpiece. In the machining program, a moving path of a tool, a feed rate of a tool, a rotation speed of the spindle, and the like are instructed using a G code, an M code, and the like.

The control unit 212 controls each unit of the machine tool 1 based on the machining program. For example, the control unit 212 controls the servo motor 5 and the spindle motor 7.

The control unit 212 performs constant-speed control based on a machining program. The constant-speed control is control to move a spindle at a feed rate specified by a machining program.

Further, the control unit 212 performs constant-load control based on a machining program. The constant-load control is control to change the feed rate of a spindle specified by a machining program so that the load on the spindle matches a load set by the target load setting unit 216. In the constant-load control, variation in the load on the spindle can be more suppressed than in the constant-speed control.

The spindle load detection unit 213 detects time-series data on the load on the spindle when a workpiece is machined based on a machining program. Further, the spindle load detection unit 213 detects time-series data indicating the feed rate of the spindle. That is, the spindle load detection unit 213 detects the load on the spindle and the feed rate of the spindle at each predetermined period while a workpiece is being machined based on the machining program.

For example, the spindle load detection unit 213 detects the load on the spindle based on a current value indicated by the ammeter 61 built in the spindle amplifier 6. Further, the spindle load detection unit 213 detects the feed rate of the spindle based on data detected by the speed detector built in the servo motor 5. Note that the load on a spindle is load torque applied in the opposite direction to the rotation direction of the spindle.

The spindle load storage unit 214 stores time-series data on the load on the spindle detected by the spindle load detection unit 213. That is, the spindle load storage unit 214 stores time-series data indicating the load on the spindle when a workpiece is machined. Further, the spindle load storage unit 214 stores time-series data indicating the feed rate of the spindle applied when a workpiece is machined. The time-series data stored in the spindle load storage unit 214 is time-series data detected when the constant-speed control on the spindle is performed based on a machining program.

Figure 3:
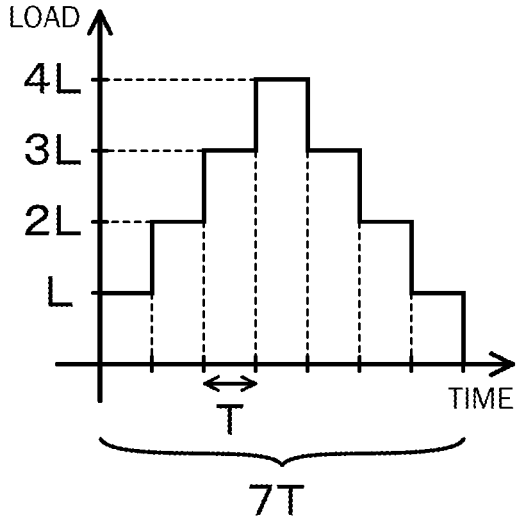
FIG. 3 is a diagram illustrating an example of time-series data stored in a spindle load storage unit.

FIG. 3 is a diagram illustrating an example of the time-series data stored in the spindle load storage unit 214. That is, the time-series data illustrated in FIG. 3 is data detected when machining was performed under the constant-speed control. FIG. 3 illustrates that the spindle load storage unit 214 sequentially stores time-series data L, 2L, 3L, 4L, 3L, 2L, and L indicating the load detected at each predetermined period T.

Now, turning back to the description of FIG. 2.

The target load accepting unit 215 accepts input of the value indicating a target load on the spindle when the constant-load control is performed. For example, the target load accepting unit 215 accepts a value input by an operator using the input/output device 3. The operator uses, for example, the input/output device 3 to input a target load on the spindle when a workpiece is machined under the constant-load control.

The target load setting unit 216 sets a target load on the spindle accepted by the target load accepting unit 215. The target load setting unit 216 sets a target load by storing data indicating the target load in a predefined register (not illustrated), for example.

The machining time prediction unit 217 predicts a machining time taken when the feed rate of the spindle is controlled so that the load on the spindle matches a target load, and this prediction is made based on the time-series data stored in the spindle load storage unit 214. That is, the machining time predicted by the machining time prediction unit 217 is a machining time when a machining program executed at the time of acquisition of the time-series data stored in the spindle load storage unit 214 is executed under the constant-load control. In other words, the machining time prediction unit 217 predicts a machining time taken when a machining program is executed so that a target load set by the target load setting unit 216 is applied on the spindle, and this prediction is made based on the time-series data detected when the constant-speed control is performed. The machining time prediction unit 217 predicts a machining time assuming that a load on the spindle and a feed rate of the spindle are proportional to each other.

FIG. 4A to FIG. 4D and FIG. 5 are diagrams illustrating a method of predicting a machining time performed by the machining time prediction unit 217. First, the machining time prediction unit 217 reads time-series data on the load on the spindle stored in the spindle load storage unit 214. The time-series data indicating the load on the spindle is data detected at each predetermined period T.

Next, the machining time prediction unit 217 calculates a machining time taken when the load on the spindle in each period T is changed to a target load to perform machining. For example, to change the load L to a target load 2L under the assumption that the load on the spindle and the feed rate of the spindle are proportional to each other, the feed rate of the spindle is required to be doubled. In such a case, the machining time for machining the section where the load L has been detected will be T/2 (see FIG. 4A). Since the load in the section where the load 2L has been detected is the same as the target load, the feed rate of the spindle is not changed. That is, the machining time T is not changed (see FIG. 4B).

Figure 4A:
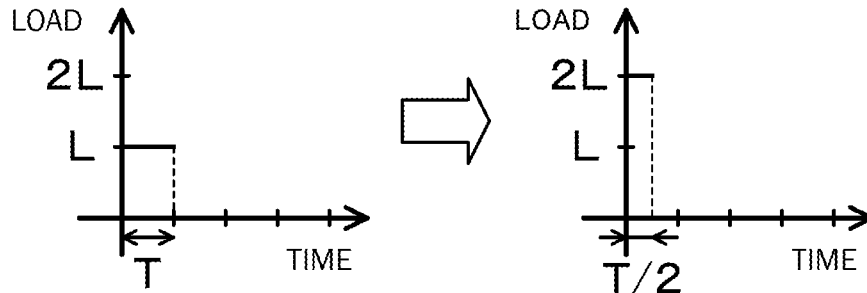
FIG. 4A is a diagram illustrating a method of predicting a machining time performed by a machining time prediction unit.
Figure 4B:
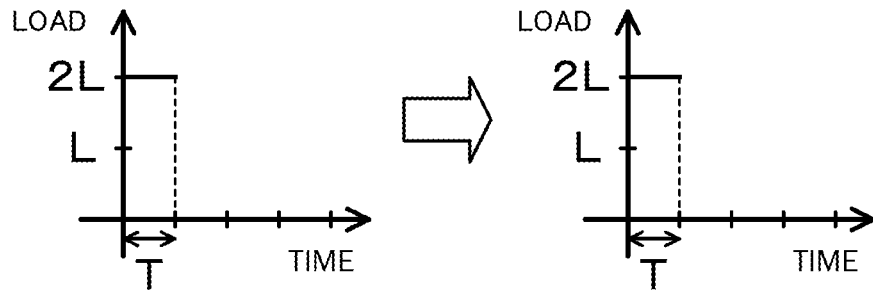
FIG. 4B is a diagram illustrating a method of predicting a machining time performed by the machining time prediction unit.
Figure 4C:
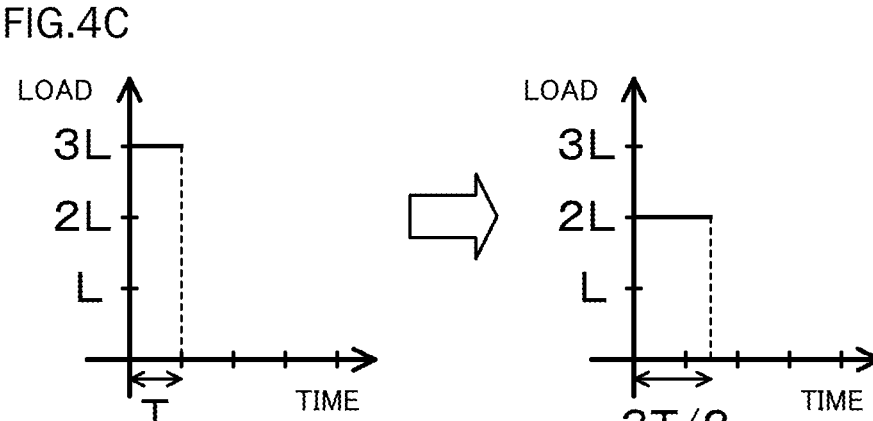
FIG. 4C is a diagram illustrating a method of predicting a machining time performed by the machining time prediction unit.
Figure 4D:
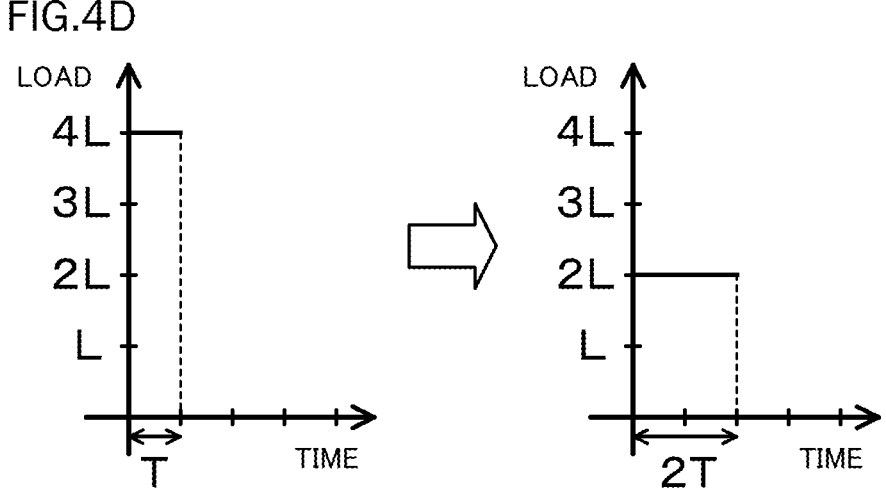
FIG. 4D is a diagram illustrating a method of predicting a machining time performed by the machining time prediction unit.

When the load in the section where a load 3L has been detected is changed to 2L, the machining time for machining of this section will be 3T/2 (see FIG. 4C). Similarly, when the load in the section where a load 4L has been detected is changed to 2L, the machining time for machining of this section will be 2T (see FIG. 4D).

Figure 5:
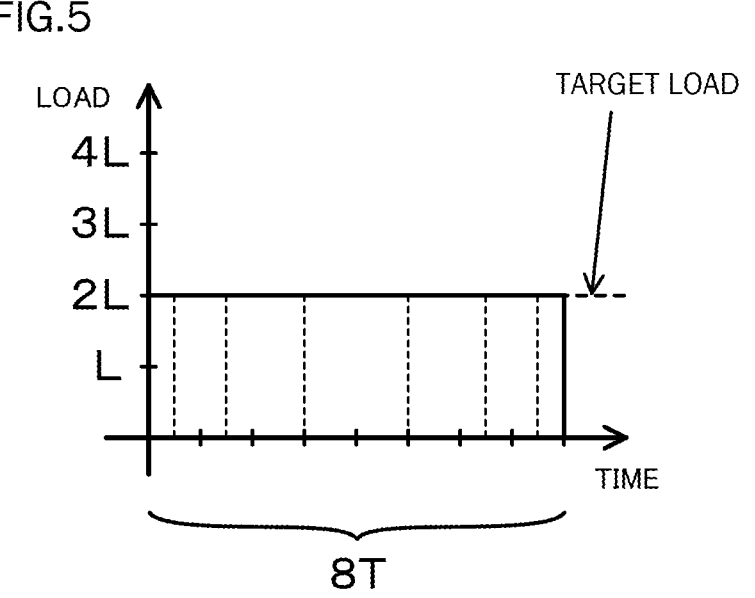
FIG. 5 is a diagram illustrating a method of predicting a machining time performed by the machining time prediction unit.

Next, the machining time prediction unit 217 sums up each machining time taken when the load on the spindle in each period T is changed to a target load (see FIG. 5). This enables the machining time prediction unit 217 to predict a machining time taken when the constant-load control is performed so that the load on the spindle matches a target load. Note that the machining time prediction unit 217 may further predict the feed rate in each period applied when the feed rate is controlled so that the load on the spindle matches a target load.

The machining time output unit 218 outputs data indicating a machining time predicted by the machining time prediction unit 217. For example, the machining time output unit 218 outputs data indicating a machining time and data indicating a target load to the input/output device 3 and causes the input/output device 3 to display the machining time and the target load. The machining time output unit 218 may output a feed rate of the spindle calculated in a process in which the machining time prediction unit 217 predicts a machining time. In such a case, the machining time output unit 218 may output data indicating a feed rate of the spindle such that a feed rate of the spindle for each period T is graphically displayed.

Note that the control unit 212 may execute a machining program under the constant-load control to perform machining of a workpiece so that a target load accepted by the target load accepting unit 215 is applied on the spindle. In such a case, it is possible to perform machining of a workpiece in a machining time predicted by the machining time prediction unit 217 or a machining time close thereto.

Next, a flow of the process performed by the numerical controller 2 will be described.

Figure 6:
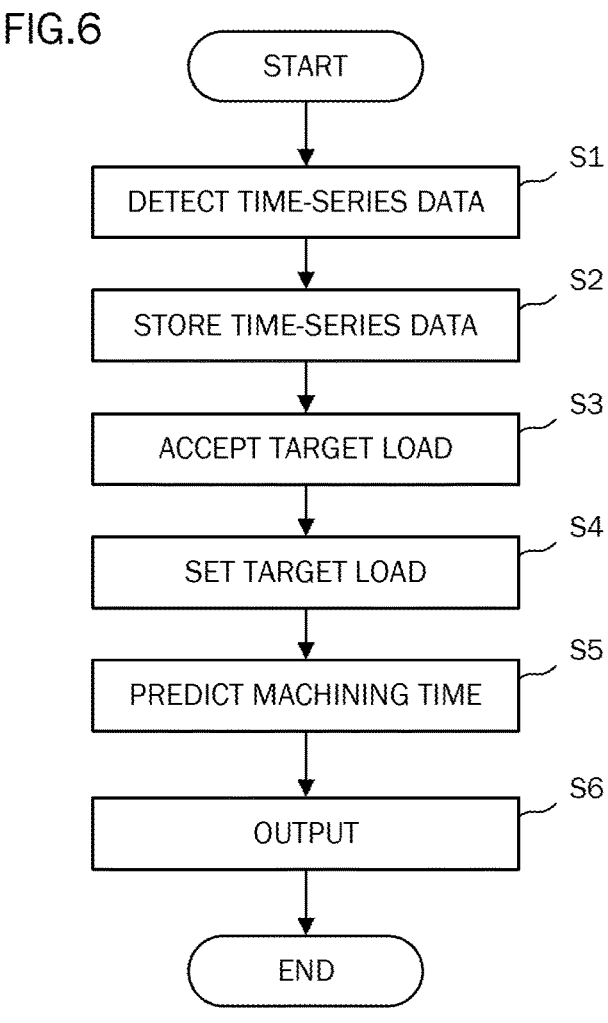
FIG. 6 is a flowchart illustrating an example of a flow of a process performed by the numerical controller.

FIG. 6 is a flowchart illustrating an example of a flow of the process performed by the numerical controller 2. First, the spindle load detection unit 213 detects time-series data indicating a load on the spindle when a workpiece is machined under the constant-speed control based on a machining program (step S1).

Next, the spindle load storage unit 214 stores the time-series data indicating the load on the spindle detected by the spindle load detection unit 213 (step S2).

Next, the target load accepting unit 215 accepts input of a value indicating a target load on the spindle (step S3).

Next, the target load setting unit 216 sets a target load accepted by the target load accepting unit 215 (step S4).

Next, the machining time prediction unit 217 predicts a machining time taken when the feed rate of the spindle is controlled so that the load on the spindle matches the target load (step S5).

Finally, the machining time output unit 218 outputs data indicating the machining time predicted by the machining time prediction unit 217 (step S6) and ends the process.

As described above, the numerical controller 2 includes the spindle load detection unit 213 that detects time-series data on the load on the spindle when a workpiece is machined, the target load setting unit 216 that sets a target load on the spindle, the machining time prediction unit 217 that, based on the time-series data, predicts a machining time taken when the feed rate of the spindle is controlled so that the load on the spindle matches the target load, and the machining time output unit 218 that outputs data on the predicted machining time. This enables the numerical controller 2 to output a machining time taken when the feed rate of the spindle is controlled so that a target load is applied on the spindle. As a result, the operator is able to take the output machining time into consideration to determine a load on the spindle. For example, this enables the operator to determine a load on the spindle so as to achieve a machining time in accordance with a cycle time of machining in a previous process.

Further, the numerical controller 2 further includes the target load accepting unit 215 that accepts input of a value indicating a target load set by the target load setting unit 216. Thus, the numerical controller 2 can predict a machining time in accordance with an input target load.

Further, the machining time prediction unit 217 predicts a machining time assuming that the load on the spindle and the feed rate thereof are proportional to each other. Thus, the machining time prediction unit 217 can predict a machining time without performing complex calculation.

Further, the machining time prediction unit 217 further predicts a feed rate applied when the feed rate of the spindle is controlled so that the load on the spindle matches a target load. This enables the operator to determine whether or not the feed rate of the spindle is a rate suitable for machining of a workpiece and then set a target load.

Further, the numerical controller 2 further includes the spindle load storage unit 214 that stores time-series data detected by the spindle load detection unit 213. This enables the machining time prediction unit 217 to predict a machining time any number of times based on various target loads accepted by the target load accepting unit 215.

In the embodiment described above, the machining time prediction unit 217 predicts a machining time assuming that a load on the spindle and a feed rate of the spindle are proportional to each other. However, the machining time prediction unit 217 may predict a machining time based on a correlation model indicating the relationship between a load on the spindle and a feed rate of the spindle.

Figure 7:
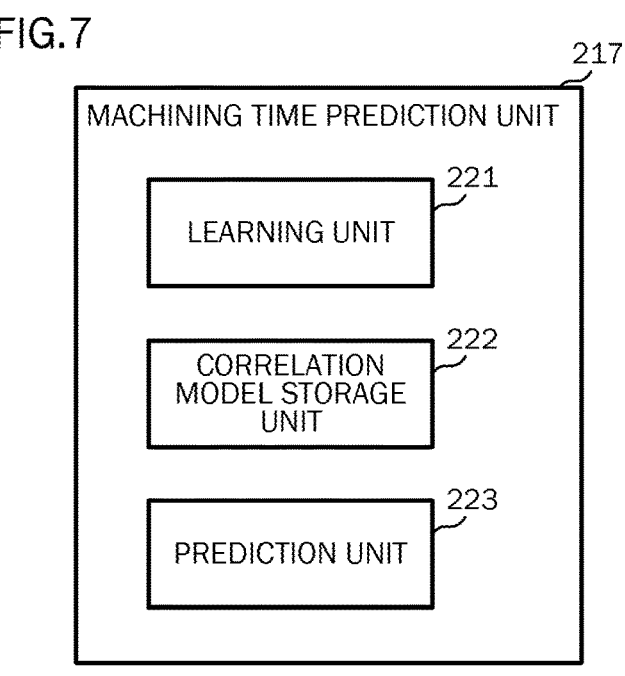
FIG. 7 is a diagram illustrating an example of the machining time prediction unit including a learning unit.

FIG. 7 is a diagram illustrating an example of the machining time prediction unit 217. The machining time prediction unit 217 includes a learning unit 221, a correlation model storage unit 222, and a prediction unit 223. Note that the configuration except for the machining time prediction unit 217 is the same as the configuration of the embodiment described above.

The learning unit 221 generates a correlation model indicating the relationship between a load on the spindle and a feed rate of the spindle based on time-series data indicating the load on the spindle and time-series data indicating the feed rate of the spindle stored in the spindle load storage unit 214. The learning unit 221 generates a correlation model by using a regression equation, a support vector machine (SVM), or a neural network, for example.

The correlation model storage unit 222 stores a correlation model generated by the learning unit 221.

The prediction unit 223 uses a correlation model stored in the correlation model storage unit 222 to predict a machining time taken when the spindle is controlled so that the load on the spindle matches a target load. Further, the prediction unit 223 may use a correlation model to predict a feed rate of the spindle applied when the spindle is controlled so that the load on the spindle matches a target load.

The data indicating a machining time predicted by the prediction unit 223 is output by the machining time output unit 218.

In the embodiment described above, the machining time prediction unit 217 further includes the learning unit 221 that learns the relationship between the load on the spindle and the feed rate thereof, and the machining time prediction unit 217 predicts a machining time based on the relationship learned by the learning unit 221. Therefore, the machining time prediction unit 217 can predict a machining time with high accuracy.

Note that the target load accepting unit 215 may accept a value indicating a ratio of a target torque to rated torque, for example, as the value indicating a target load on the spindle. For example, it is possible to set a target load by accepting numerical input such as 50%, 55%, 60%, or 65%.

Further, although the numerical controller 2 of the embodiment described above includes the target load accepting unit 215, the numerical controller 2 is not necessarily required to include the target load accepting unit 215. In such a case, the numerical controller 2 can store a plurality of values indicating target loads in advance and predict respective machining times taken when the constant-load control is performed so that the plurality of target loads are applied to the spindle, respectively.

Figure 8:
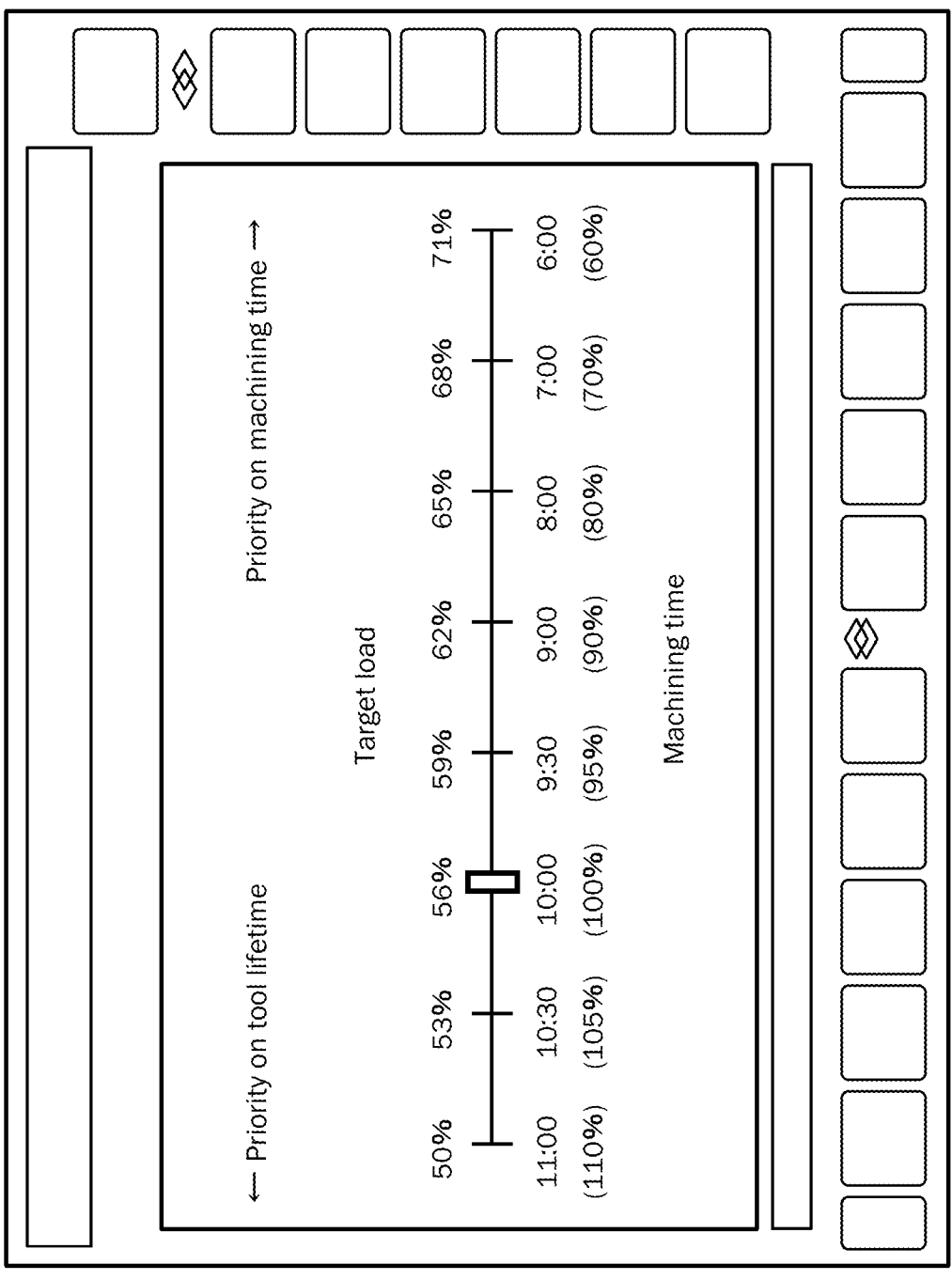
FIG. 8 is a diagram illustrating a display example of a machining time displayed on an input/output device.

FIG. 8 is a diagram illustrating a display example of a machining time displayed on the input/output device 3 when machining times are predicted for respective ones of a plurality of target loads. In the numerical controller 2, for example, values indicating ratios of the target torque to rated torque are stored in advance as target loads. In the example illustrated in FIG. 8, 50%, 53%, 56%, 59%, 62%, 65%, 68%, and 71% are stored as target loads.

The machining time prediction unit 217 predicts respective machining times taken when the constant-load control is performed so that these target loads are applied to the spindle, respectively. The data indicating a machining time predicted by the machining time prediction unit 217 is output by the machining time output unit 218 and displayed on a display screen of the input/output device 3.

For example, a straight line extending laterally with scales is displayed on the display screen. On the upper side of this straight line, values indicating ratios of target torque to rated torque are displayed as the target load.

On the underside of the straight line, machining times predicted in association with respective target loads are displayed. For example, machining time 11:00 is displayed in association with target load 50%. Further, machining time 10:30 is displayed in association with target load 53%. Further, machining time 10:00 is displayed in association with target load 56%. Further, machining time 9:30 is displayed in association with target load 59%. Further, machining time 9:00 is displayed in association with target load 62%. Further, machining time 8:00 is displayed in association with target load 65%. Further, machining time 7:00 is displayed in association with target load 68%. Further, machining time 6:00 is displayed in association with target load 71%.

Display of the machining time in such a manner enables the operator to easily recognize respective machining times taken when the spindle is controlled so that each load is applied thereto.

Note that ratios of machining times when the constant-load control is performed at respective target loads to machining times when a machining program is performed under the constant-speed control may be displayed under the region where respective machining times are displayed. For example, in the example illustrated in FIG. 8, the machining time is 10:00 when the constant-speed control is performed, and the ratios, to this machining time, of the machining time when the constant-load control is performed at respective target loads are displayed in parentheses.

Further, as illustrated in FIG. 8, when target loads and machining times corresponding to the target loads are arranged as pairs, respectively, and displayed on the input/output device 3, any one of the target loads may be selected on the display screen. In such a case, a workpiece may be machined under the constant-load control so that a selected target load is applied to the spindle.

In the embodiment described above, the numerical controller 2 includes the spindle load storage unit 214. However, the numerical controller 2 is not necessarily required to include the spindle load storage unit 214.

Figure 9:
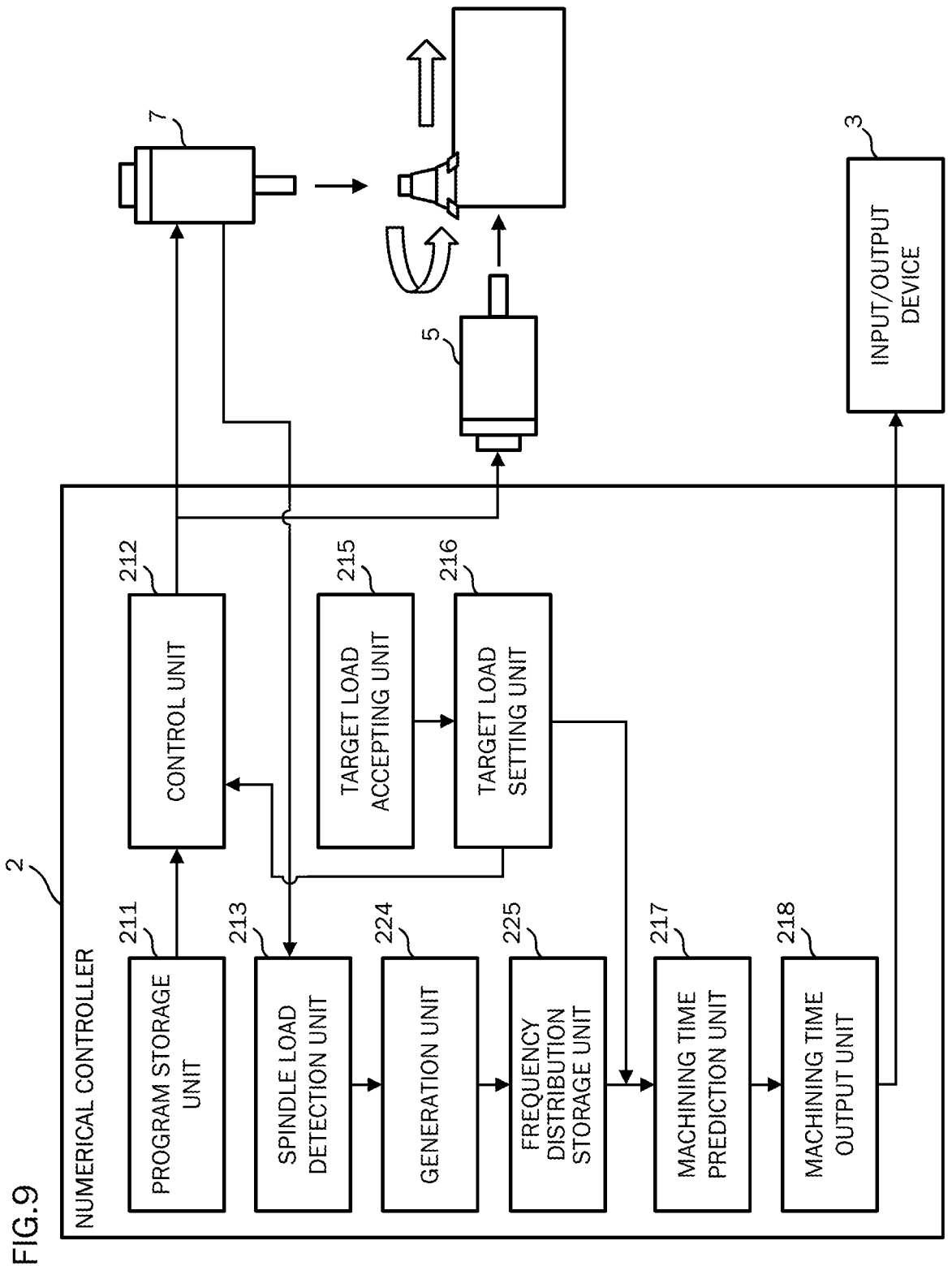
FIG. 9 is a block diagram illustrating an example of functions of the numerical controller.

FIG. 9 is a block diagram illustrating an example of functions of the numerical controller 2. The numerical controller 2 includes a generation unit 224 and a frequency distribution storage unit 225 instead of the spindle load storage unit 214. The rest of the configuration is the same as the configuration of the numerical controller 2 illustrated in FIG. 2.

For example, the generation unit 224 is implemented when the CPU 201 performs calculation processing by using a system program stored in the ROM 203 and a machining program and various data stored in the nonvolatile memory 205. For example, the frequency distribution storage unit 225 is implemented when data generated by the CPU 201 performing calculation processing by using a system program and various data is stored in the RAM 204 or the nonvolatile memory 205.

The generation unit 224 generates frequency distribution data based on the time-series data detected by the spindle load detection unit 213.

Figures 10, 11:
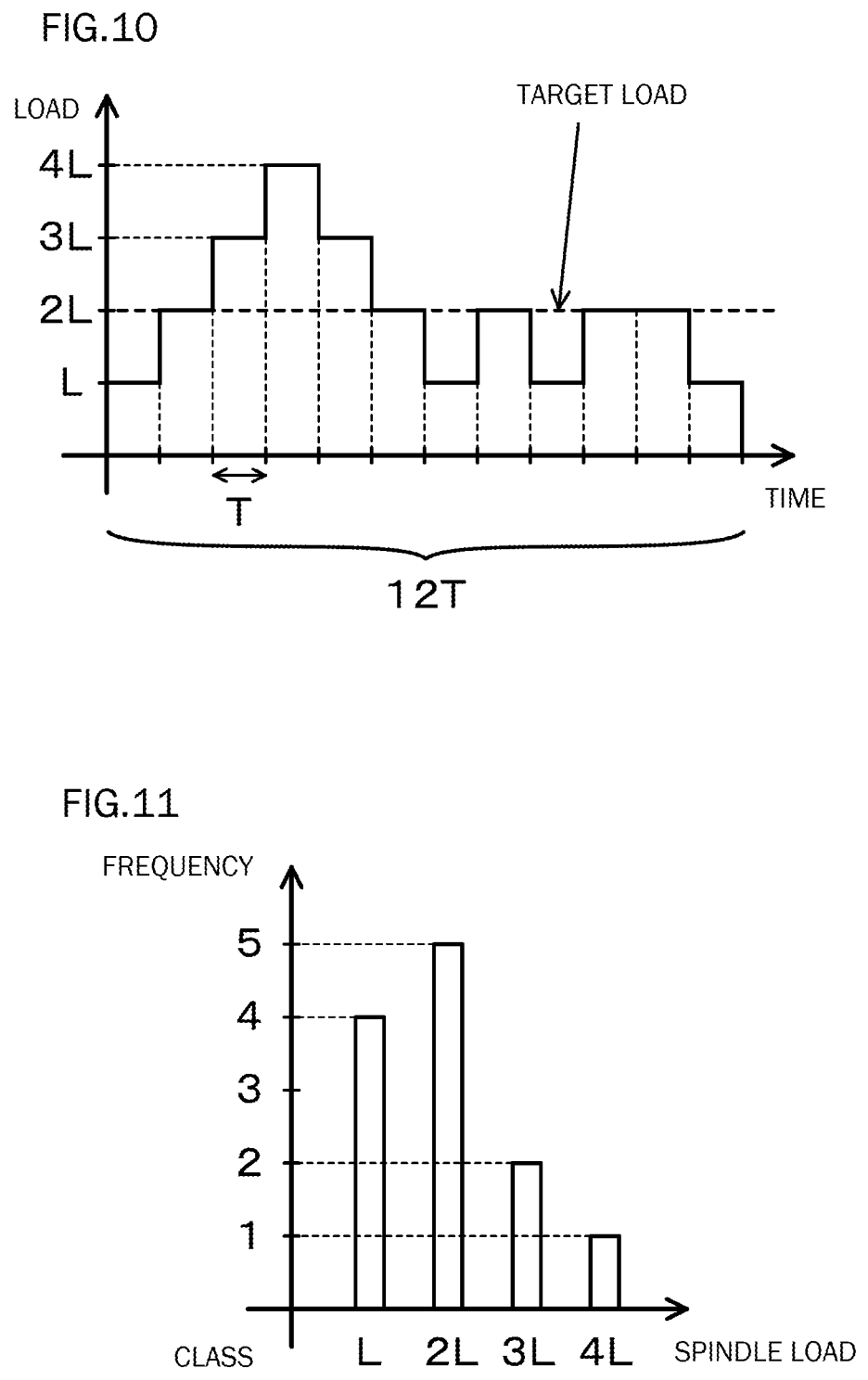

FIG. 10 is a diagram illustrating time-series data on the load on the spindle detected by the spindle load detection unit 213. That is, the time-series data illustrated in FIG. 10 is data detected when machining is performed under the constant-speed control. FIG. 11 is a diagram illustrating an example of a frequency distribution. The generation unit 224 classifies loads on the spindle detected by the spindle load detection unit 213 into a plurality of classes and counts the frequency for each class. For example, the generation unit 224 classifies the detected loads into any one of four classes L, 2L, 3L, and 4L. For example, the generation unit 224 rounds off values of loads detected by the spindle load detection unit 213 to classify the values into any one of L, 2L, 3L, and 4L.

For example, the generation unit 224 classifies a load having a level that is greater than or equal to 0.5L and less than 1.5L into the class L. Similarly, the generation unit 224 classifies a load having a level that is greater than or equal to 1.5L and less than 2.5L into the class 2L. Similarly, the generation unit 224 classifies a load having a level that is greater than or equal to 2.5L and less than 3.5L into the class 3L. Similarly, the generation unit 224 classifies a load having a level that is greater than or equal to 3.5L and less than 4.5L into the class 4L. In the example illustrated in FIG. 11, four data indicating loads are classified into the class L, five data indicating loads are classified into the class 2L, two data indicating loads are classified into the class 3L, and one data indicating a load is classified into the class 4L.

The frequency distribution storage unit 225 stores frequency distribution data generated by the generation unit 224.

The machining time prediction unit 217 predicts a machining time based on frequency distribution data stored in the frequency distribution storage unit 225. The machining time prediction unit 217 calculates a machining time taken when a load indicated by each class is changed to a target load to perform machining and sums up the machining times of respective classes to calculate a machining time. The machining times $T_L$, $T_{2L}$, $T_{3L}$, and $T_{4L}$ of respective classes L, 2L, 3L, and 4L can each be found by "frequency"× "value of class"×"period"/"target load", respectively.

For example, the machining time $T_L$ calculated for the class L illustrated in FIG. 11 is $T_L$=4×L×T/2L=2T. Similarly, the machining time $T_{2L}$ calculated for the class 2L is $T_{2L}$=5×2L×T/2L=5T. Similarly, the machining time $T_{3L}$, calculated for the class 3L is $T_{3L}$=2×3L×T/2L=3T. Similarly, the machining time $T_{4L}$ calculated for the class 4L is $T_{4L}$ 1×4L×T/2L=2T. These machining times calculated for respective classes are summed up, and thereby the machining time 12T is found.

In the embodiment described above, the numerical controller 2 further includes the frequency distribution storage unit 225 that stores data indicating a frequency distribution generated based on the time-series data detected by the spindle load detection unit 213. Therefore, the amount of stored data can be reduced compared to a case where the spindle load storage unit 214 stores the time-series data.

Note that the machining time calculated for each class does not need to be calculated in the order described above. For example, values of "frequency"×"value of class" calculated for respective classes may be summed up, and the summed value may then be multiplied by "period"/"target load" to find a machining time.

LIST OF REFERENCE SYMBOLS

1 machine tool
2 numerical controller
201 CPU
202 bus
203 ROM
204 RAM
205 nonvolatile memory
206 interface

207 axis control circuit
208 spindle control circuit
209 PLC
210 I/O unit
211 program storage unit
212 control unit
213 spindle load detection unit
214 spindle load storage unit
215 target load accepting unit
216 target load setting unit
217 machining time prediction unit
218 machining time output unit
221 learning unit
222 correlation model storage unit
223 prediction unit
224 generation unit
225 frequency distribution storage unit
3 input/output device
4 servo amplifier
5 servo motor
6 spindle amplifier
61 ammeter
7 spindle motor
8 auxiliary device
The invention claimed is:
1. A numerical controller comprising:
a processor, the processor is configured to:
detect time-series data on a load on a spindle when a workpiece is machined;
set a target load on the spindle;
based on the time-series data, predict a machining time taken when a feed rate of the spindle is controlled so that a load on the spindle matches the target load; and
output data on the predicted machining time, wherein,
the processor is configured to predict the machining time based on a calculated feed rate assuming that a load on the spindle and the feed rate are proportional to each other, and calculate the feed rate based on the target load.

2. The numerical controller according to claim 1, wherein the processor accepts input of a value indicating the target load set by the processor.
3. The numerical controller according to claim 1, wherein the processor is configured to learn a relationship between a load on the spindle and the feed rate, and
predict the machining time based on the relationship learned by the processor.
4. The numerical controller according to claim 1, wherein the processor is further configured to output data indicating a relationship between the target load and the predicted machining time.
5. The numerical controller according to claim 1, wherein the processor is configured to predict the feed rate applied when the feed rate is controlled so that a load on the spindle matches the target load.
6. The numerical controller according to claim 1, wherein the processor is configured to store the time-series data detected by the processor.
7. The numerical controller according to claim 1, wherein the processor is configured to store frequency distribution data generated based on the time-series data detected by the processor.
8. A non-transitory computer readable storage medium storing an instruction that causes a computer to perform:
detecting time-series data on a load on a spindle when a workpiece is machined;
setting a target load on the spindle;
based on the time-series data, predicting a machining time taken when a feed rate of the spindle is controlled so that a load on the spindle matches the target load;
outputting data on the predicted machining time; and
predicting the machining time based on a calculated feed rate assuming that a load on the spindle and the feed rate are proportional to each other, and calculate the feed rate based on the target load.

* * * * *